(No Model.)
G. WESTINGHOUSE, Jr.
PIPE LINE FOR GAS SUPPLY.
No. 319,365. Patented June 2, 1885.
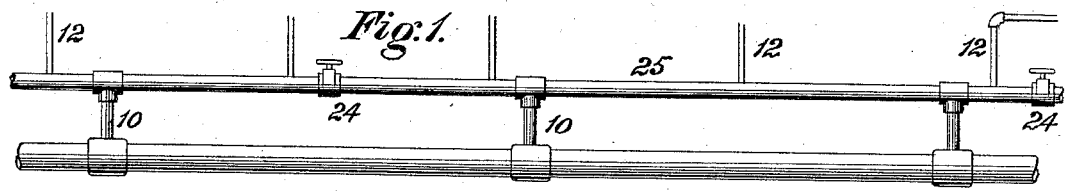
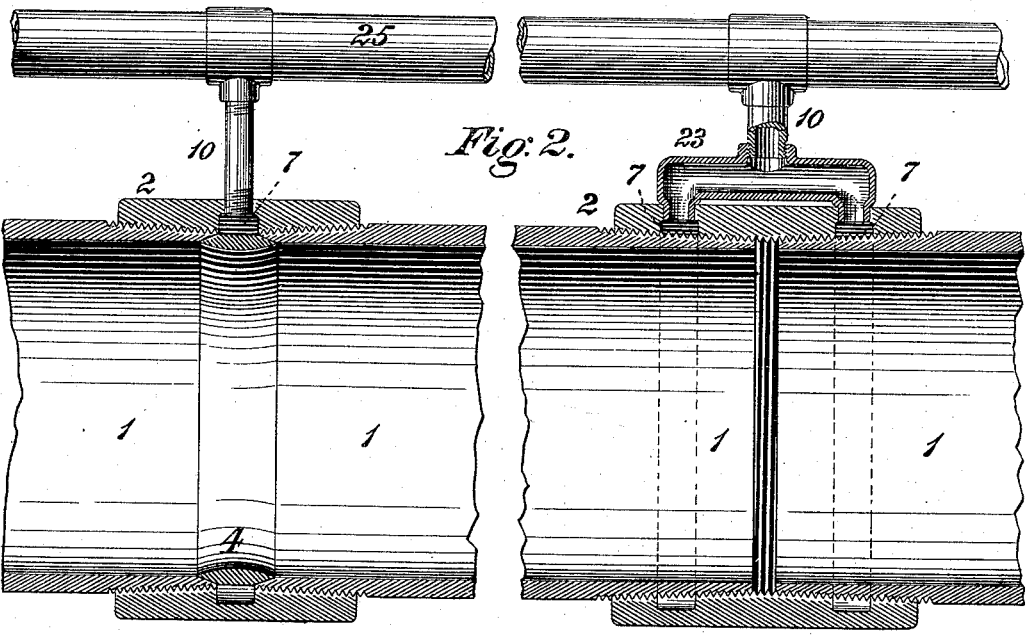
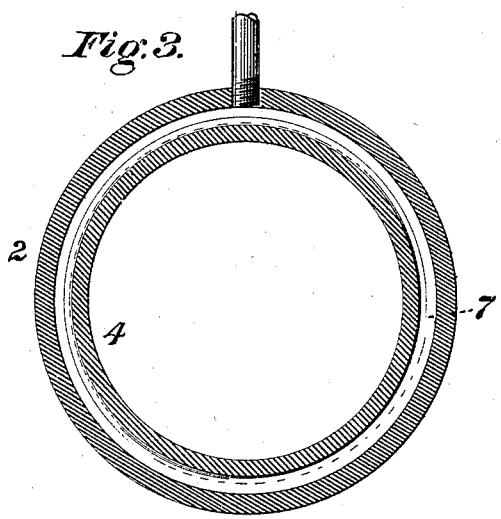
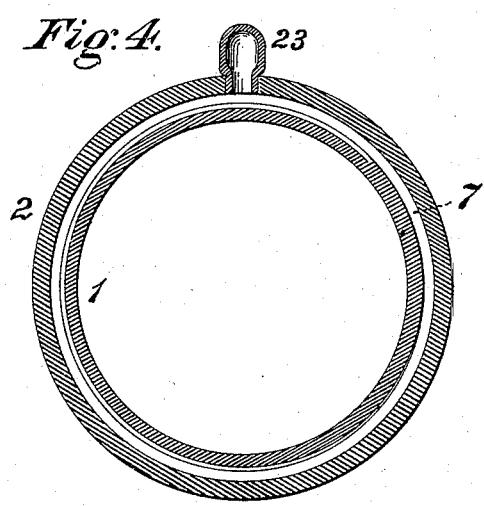
WITNESSES:
J. Snowden Bell.
C. M. Clarke.
INVENTOR.
George Westinghouse, Jr.
BY George H. Christy
ATTORNEY.

UNITED STATES PATENT OFFICE.

GEORGE WESTINGHOUSE, JR., OF PITTSBURG, PENNSYLVANIA.

PIPE-LINE FOR GAS-SUPPLY.

SPECIFICATION forming part of Letters Patent No. 319,365, dated June 2, 1885.

Application filed April 21, 1885. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Pipe-Lines for Gas-Supply, of which improvement the following is a specification.

In the accompanying drawings, which make part of this specification, Figure 1 is a diagrammatic plan of a pipe-line embodying my invention; Fig. 2, a longitudinal central section on an enlarged scale through two of the couplings of the same; and Figs. 3 and 4, transverse central sections through the couplings shown on the left and on the right of Fig. 2, respectively.

The object of my invention is to prevent the leakage of gas from the joints or connections of pipe lines or mains into the surrounding ground, and to effect the utilization of any gas tending to leak from the joints as a source of supply at lower pressure than that existing in the main.

To these ends my invention, generally stated, consists in the combination of a gas-main or pipe-line having joints or couplings provided with internal chambers or receptacles, each communicating with one or both of the adjacent pipe-sections, and a low-pressure line extending in direction corresponding with that of the main and low-pressure supply-pipes, each leading from one of said chambers to the low-pressure line. The improvement claimed is hereinafter more fully set forth.

In the practice of my invention I provide any desired number of the joints or couplings of a gas-main or pipe-line through which gas is conveyed from a well or other source of supply with internal chambers or receptacles, 7, each of which has a portion of its walls or boundaries formed by one or both of the sections of pipe, which are connected by the joint in such manner that any gas leaking from the main thereat must pass into and through said chamber to gain egress from the main. As illustrated on the left of Fig. 2 and in Fig. 3, the chamber 7 is formed between the inside of the coupling-socket 2 (which may be recessed to a greater or less degree, as desired, to afford increased capacity) and an expander-ring, 4, fitting closely between the ends of the two pipe-sections 1 1, which are connected by the coupling, such construction, which is not *per se* herein claimed, being set forth in an application for Letters Patent filed by me under date of March 21, 1885, Serial No. 159,638.

A modification of the chamber 7 is illustrated on the right of Fig. 2 and in Fig. 4. In this case two annular grooves or recesses are formed within the bore of the socket, each being located between its transverse center and one of its ends, and being closed on its inner side by the adjacent pipe-section when the latter is screwed into engagement with the socket. Each of the chambers 7 thus provided has an opening or vent, and the vents of the two chambers of each coupling-socket are preferably connected, as shown, by a U-shaped pipe, 23, which serves as an attachment to a low-pressure supply-pipe, 10, as presently to be described.

This construction, which is set forth in another application filed by me of even date herewith, and marked "Case C," is not herein claimed, and is cited as an instance of a suitable alternative, it being obvious that, as in the former case, any leakage from the main at the junction of the sections will be compelled to pass into the chamber 7 before escaping from the main. The precise form and location of the chamber 7 are not, however, material, so long as it possesses the capacity of intercepting leakage, and may be varied in the judgment of the constructor without departing from the spirit of my invention.

A low-pressure line, 25, extends in corresponding direction to the main 1 at a suitable distance therefrom, and is provided with service pipes or branches 12, leading to desired points of utilization for domestic or other service in which gas of comparatively low pressure is required.

Stop-valves 24 are located in the line 25 at such distance apart as may be deemed desirable, in order to enable different sections of the line to be shut off from time to time for purposes of testing, renewal, or repair.

Each of the chambers 7 of the joints or couplings of the main 1 is connected by a low-pressure supply-pipe, 10, with the low-pressure line 25, said pipes serving to conduct any gas which may leak from the main 1 into the chambers to the low-pressure line, from which it is delivered for utilization by the service-pipes 12. Where the low-pressure supply thus derived is found to be insufficient, it may be supplemented by a connection, governed by a pressure-regulator, from the main to the low-pressure line, as set forth in my Patent No. 301,191, dated July 1, 1884, or a minute opening may be formed through the inner wall of the chamber, so as to admit continuously a limited supply of gas at low pressure thereto, and the line 25 may be provided with safety-valves, to prevent undue accumulation of pressure.

It will be seen that in the employment of a chambered coupling as above described the leakage past the screw-threads of the coupling can in no case exceed that due to and corresponding with low pressure, and the maintenance of low pressure in the chambers renders it unnecessary to screw the pipes as tightly together as is usually the case, thus obviating the straining and weakening of the pipe by such tight connection at a point which is already its weakest by reason of the cutting of the screw-threads thereat.

I claim herein as my invention—

1. The combination of a pipe joint or coupling having an internal chamber or receptacle located between the interior wall of the coupling and the exterior wall of one or both of the adjacent sections of a main connected by said joint, a low-pressure line extending in corresponding directions with the main, and a low-pressure supply-pipe connecting said chamber with the low-pressure line, substantially as set forth.

2. The combination of a gas-main or pipe-line having joints or couplings provided with internal chambers or receptacles each located between the interior wall of a coupling and the exterior wall of one or both of the adjacent pipe-sections, a low-pressure line extending in direction corresponding with that of the main, a series of low-pressure supply-pipes each leading from one of said chambers to the low-pressure line, and a series of service-pipes leading from the low-pressure line to points of utilization of the gas, substantially as set forth.

In testimony whereof I have hereunto set my hand.

GEO. WESTINGHOUSE, JR.

Witnesses:
J. SNOWDEN BELL,
R. H. WHITTLESEY.